E. J. LEWIS.
MACHINE FOR PREPARING FRUITS AND VEGETABLES.
APPLICATION FILED JUNE 15, 1917.
1,264,823.
Patented Apr. 30, 1918.
2 SHEETS—SHEET 1.
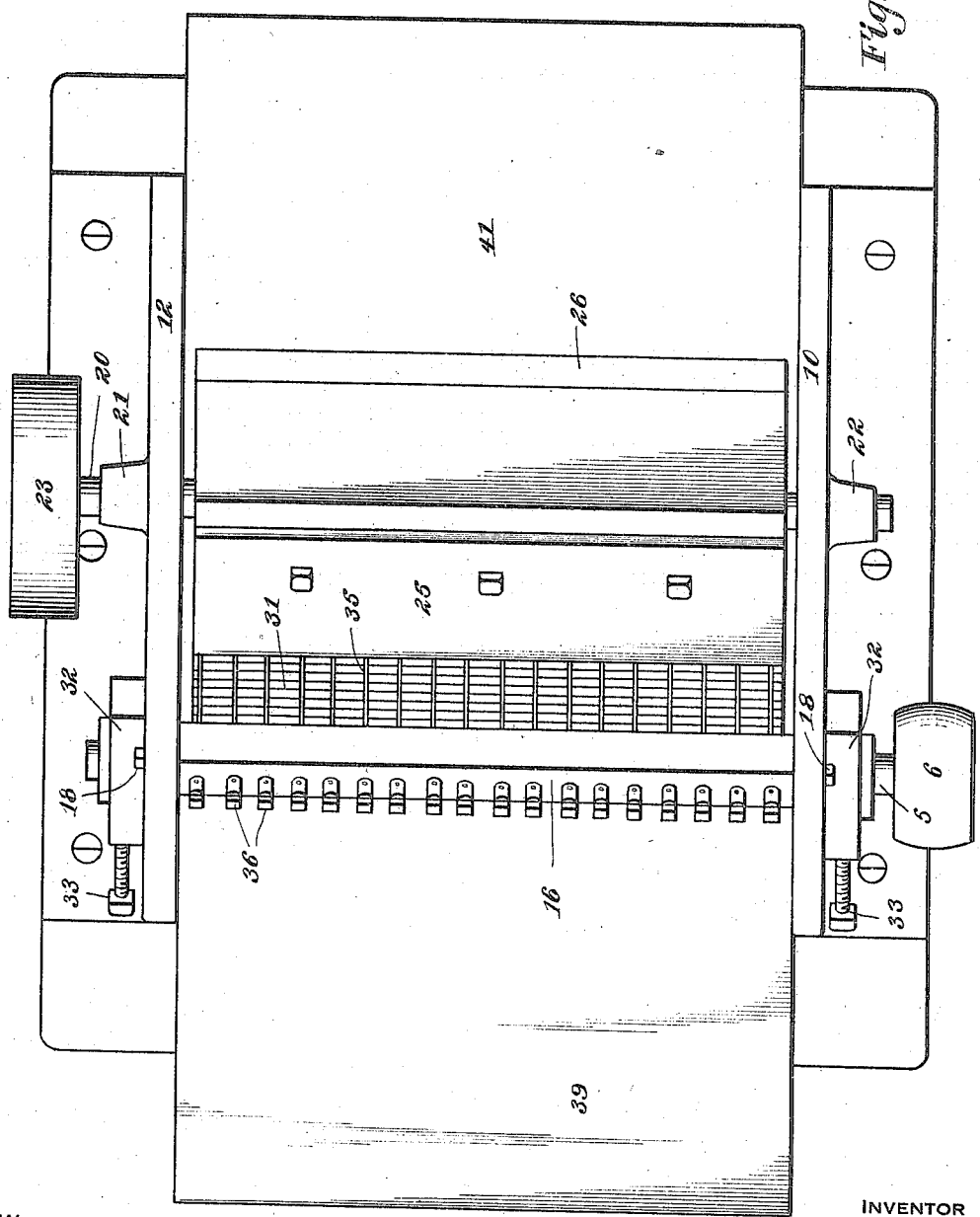
WITNESSES
C. F. Rudolph
E. M. Springer
INVENTOR
E. J. Lewis,
BY Victor J. Evans
ATTORNEY

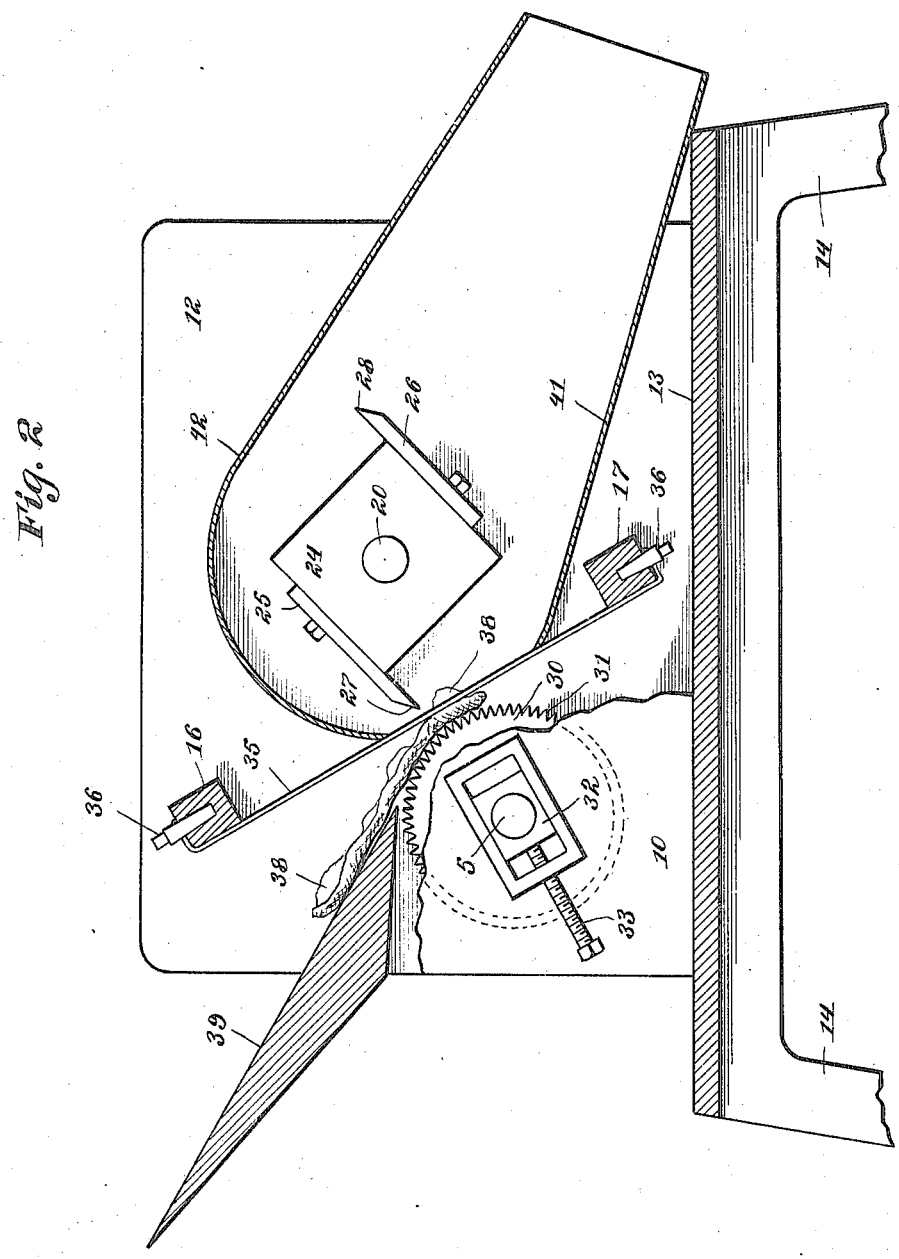

UNITED STATES PATENT OFFICE.

ELGIE J. LEWIS, OF MIDDLEPORT, NEW YORK.

MACHINE FOR PREPARING FRUITS AND VEGETABLES.

1,264,823.   Specification of Letters Patent.   Patented Apr. 30, 1918.

Application filed June 15, 1917. Serial No. 174,980.

*To all whom it may concern:*

Be it known that I, ELGIE J. LEWIS, a citizen of the United States, residing at Middleport, in the county of Niagara and State of New York, have invented new and useful Improvements in Machines for Preparing Fruits and Vegetables, of which the following is a specification.

This invention relates to a machine for preparing fruits and vegetables, and it is especially designed for removing that portion of the fruit of a pineapple or the like which adheres to the skin, after the article has been prepared for canning, for which purpose it must be reduced to a given size at the time the skin is removed.

One object is to provide certain means hereinafter described for removing the valuable portion of the fruit adhering to the skin by feeding the skin with the portion of the fruit remaining thereon into position to be operated upon by a rotating, cutting or shredding member, or a plurality of members, with means for keeping the skin out of contact with the knives or other cutting or shredding devices.

A further object is to provide a plurality of devices independently secured and constituting a guard member, said member being mounted between the feeding roller and the cutting or shredding mechanism.

Other objects will appear from the following description, and the novel features will be more particularly pointed out in the claims hereto appended.

In the drawings:

Figure 1 is a top plan view.

Fig. 2 is a view in vertical section.

The machine includes a frame work comprising a plurality of uprights 10 and 12 mounted on a base 13 provided with suitable legs 14. Extending between members 10 and 12 of the frame are a plurality of stationary bars 16 and 17 retained in position by any suitable securing devices such as those designated 18. These bars 16 and 17 serve to mount a plurality of independent devices which together constitute a guard adapted to be positioned between the cutting and shredding mechanism and the feeding device.

A shaft 20 extends horizontally between members 10 and 12, being mounted in bearings 21 and 22 and carrying a pulley 23 on one end thereof. This shaft carries a rectangular member 24 constituting a head for the cutting or shredding device. In the present instance I have shown a plurality of blades 25 and 26 provided, respectively, with cutting edges 27 and 28 for removing the valuable portion of the fruit from the skin. These blades are secured in such position that during the rotation of the shaft above mentioned the edges of the blades will be in proximity to the guard member but of course will not come into contact therewith. I do not limit myself to any particular form of cutting or shredding mechanism.

The feeding device comprises a roller 30 having a corrugated surface 31, said roller being mounted in adjustable bearings 32 controlled by means of adjusting screws 33 in order that the roller may be accurately positioned with reference to the guard member in accordance with the circumstances. The material to be fed varies in thickness, in some instances there being but very little pulp adhering to the skin, while in others the thickness of the layer of pulp may be about one inch. The roller 30 is driven by the shaft 5 carrying a pulley 6.

The independent wires of the guard member are designated 35 and they are retained in position by means of pins or key members designated 36 and passing into the bars 16 and 17 from their upper and lower sides, respectively, and serving to produce the necessary tension on the individual wires.

A portion of the material to be treated is shown at 38, this material passing over a feed table designated 39 from which the material passes to the feed roller and is pressed against the guard wires and between the latter into position permitting it to be operated upon by the cutting or shredding mechanism. The fruit after being removed from the skin is conveyed to one side of the machine for suitable disposition by means of an inclined discharge member designated 41. The cutting or shredding mechanism may be protected by means of a shield 42.

What is claimed is:

1. In a machine of the class described, a rotating and feeding device and a shaft therefor, a guard member comprising a plurality of independently adjustable guard elements parallelly arranged, means for moving the feeding device toward and away from the guard member, said feeding device forcing material carried thereby through the guard member, an inclined member discharging material to a point between the feeding device and the guard member and arranged substantially tangentially with reference to the feeding device, and a rotary cutting device mounted on the opposite side of the guard member.

2. In a machine of the class described, a guard member comprising a plurality of independently adjustable elements parallelly arranged, a feeding device comprising a roller having a roughened surface, said roller being spaced from the guard member and said roller being positioned to force material fed to the machine between the elements of the guard member, means for adjusting the feeding device toward and away from the guard member, and means arranged at an angle with the guard member and discharging material to the feeding device at a point on the surface thereof spaced from the point of nearest approach to the guard member.

In testimony whereof I affix my signature.

ELGIE J. LEWIS.